April 19, 1955 L. P. CROSMAN 2,706,597

CARRY IMPULSE GENERATOR

Filed March 25, 1949 4 Sheets-Sheet 1

INVENTOR.
LORING P. CROSMAN

BY Ralph W. E. Bitner

ATTORNEY

INVENTOR.
LORING P. CROSMAN
BY Ralph W. E. Bitner
ATTORNEY

April 19, 1955 L. P. CROSMAN 2,706,597

CARRY IMPULSE GENERATOR

Filed March 25, 1949 4 Sheets-Sheet 3

INVENTOR.
LORING P. CROSMAN

BY Ralph E. Bitner

ATTORNEY

INVENTOR.
LORING P. CROSMAN
BY Ralph K. E. Bitner
ATTORNEY

United States Patent Office 2,706,597

Patented Apr. 19, 1955

2,706,597

CARRY IMPULSE GENERATOR

Loring P. Crosman, Darien, Conn., assignor to Remington Rand Inc., New York, N. Y., a corporation of Delaware Application March 25, 1949, Serial No. 83,378

5 Claims. (Cl. 235—61)

This invention relates to a system of circuits and counters for entering the tens carry digit into the next higher order counter. In greater detail it relates to a carry system which stores the carry digit in a trigger stage until the next higher order counter is ready to receive it.

As used throughout the specification and claims, the term "unbalanced trigger" refers to a trigger stage comprising two electronic triodes with circuit components so adjusted that the circuit is stable only when one triode is conducting and the second triode is non-conducting. Applying an actuating pulse to such a stage momentarily switches conductivity and generates a pulse, the duration of which depends upon the circuit constants. This type of circuit is also called a "one-shot multivibrator" and a "flip-flop."

Prior art carry systems have been devised for electronic counters, but so far as information is available, all such systems have operated on a definite time program, the time intervals set aside for carry pulses being used whether there were any carrys or not.

One of the objects of the invention is to provide an improved carry system which avoids one or more of the disadvantages and limitations of prior art arrangements.

Another object of the invention is to reduce the time of operation by causing several carry stages to operate at the same time.

One feature of the invention includes an electronic carry system for adding a unit digit value to one order counter after the next lower order counter has progressed from nine to zero. A series of electronic counters is used; one for each denominational order counter, for receiving, adding, and storing digit values. Between each counter and the next higher order counter a trigger carry stage is connected. The trigger carry stages are partly controlled by a generator which provides pulses to normalize the carry stages a short interval of time after the counting action has been finished. Circuit means are provided for adding a unit digit to the next higher order counter when the actuated carry stage is normalized by the generator pulse.

For a better understanding of the present invention, together with other and further objects thereof, reference is made to the following description, taken in connection with the accompanying drawings.

Figure 1:
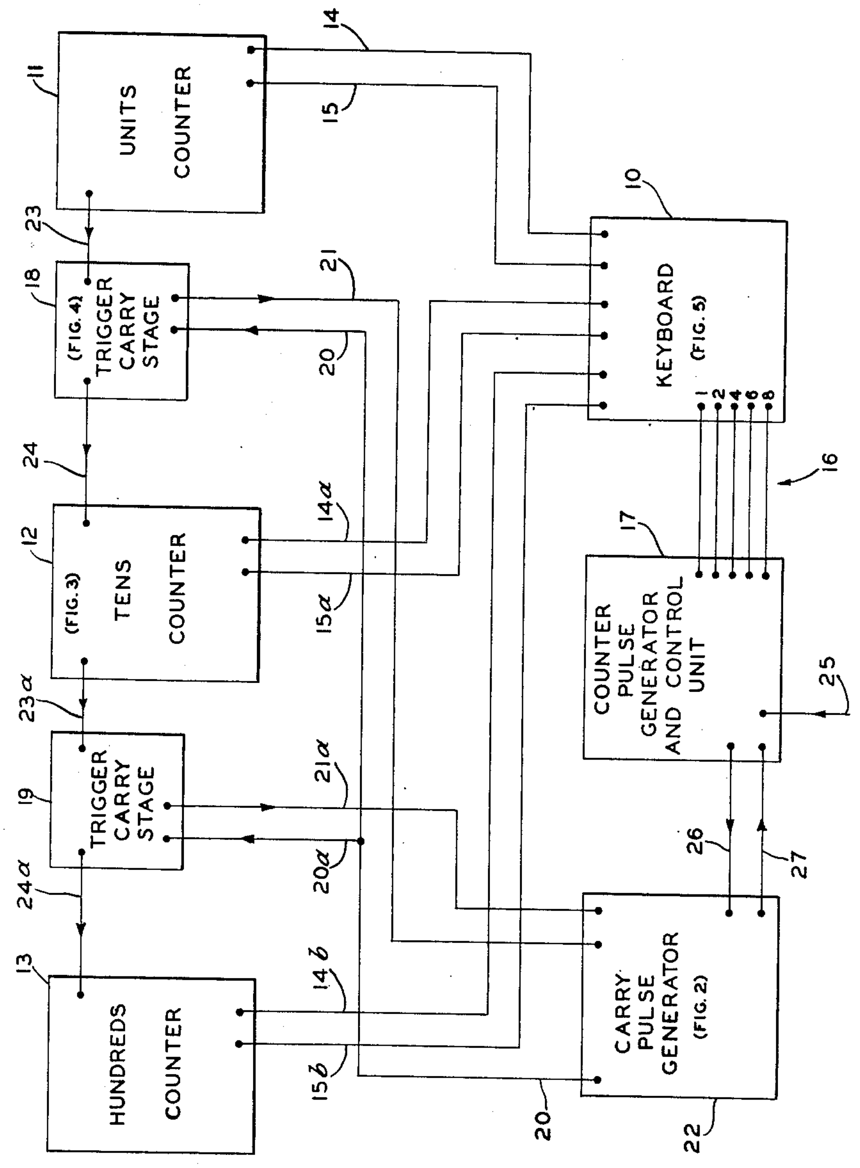
Fig. 1 is a block diagram of a complete counting accumulator showing three orders.

Referring now to Fig. 1, the entire system will be described, neglecting for the present the details of the invention. A keyboard 10, having as many sets of zero to nine keys as there are orders, is used to enter digit values to be added. These values are sent to counters 11, 12, and 13 by means of conductors 14 and 15 and pulses for operating the counters are received over the five conductors 16 leading from a counter pulse generator 17. The pulse generator is described in detail in copending application, Serial No. 18,782, filed April 3, 1948, now Patent 2,512,851.

Between successive counters are connected trigger carry stages 18 and 19, each stage having a control conductor 20 and 20*a* and a signal conductor 21 and 21*a* which connect to a carry pulse generator 22. Between the units counter 11 and the first trigger carry stage is a conductor 23 which delivers the carry pulse for storage. A conductor 24 delivers the carry pulse to the next higher order counter 12 at the proper time.

The operation, generally, is as follows: First, the amount is entered into the keyboard 10; second, a start signal is applied to the counter pulse generator 17 over a control conductor 25. The proper pulses are sent over wires 16 through the keyboard switches, to the counters 11, 12, and 13 over conductors 14 and 15. If the counters were all normalized at zero at the start of the operation there will be no carrys and no signal will be sent over conductors 23, 23*a*, 21, or 21*a*; hence, the carry pulse generator 22 will not operate. If, now, a second set of digits is sent to the counters, a carry may result. If the number 166 was entered the first operation and the number 238 entered the second time, the counters would then register 394 with a carry pulse sent over conductor 23 to enter a carry digit in the carry stage 18.

As soon as the second counter operation is finished, a signal is sent over conductor 26 to start the carry pulse generator 22. The generator, acting on information received over conductors 21 and 21*a*, starts sending out control pulses, the first one of which travels over conductor 20 (also 20*a*) to the carry stage 18 and normalizes it. When the stage is normalized, a pulse is sent over 24 to the next higher order counter 12 which has a 9 entered therein. The additional pulse changes the 9 to a 0 and actuates the next trigger carry stage 19 and sends a signal over conductor 21*a* to the carry pulse generator.

A second pulse is delivered by the generator 22 which travels over conductor 20*a* (also 20) and normalizes the carry stage 19, sending a delayed pulse over 24*a* to the hundreds counter 13 changing the recorded 3 to a 4. The counter now indicates a total of 404 which is correct sum of 166 and 238.

The first carry pulse was sent to both carry stages 18 and 19, but only 18 was normalized since it was the only one which had been actuated at that time. The normalizing pulse sent to normal stage 19 had no effect. A similar condition exists when the second pulse is sent from generator 22; only the second carry stage 19 is effected.

When there is no signal received by generator 22 over conductors 21 and 21*a*, the generator stops sending out control pulses, but instead sends a stop signal over conductor 27 which normalizes the control system and signals the program control unit (not shown) to proceed to the next operation.

Having now described the invention in general terms, reference is made to Figs. 2, 3, 4, and 5, which show the detailed wiring diagrams.

The counter (Fig. 3) uses a bi-quinary system of registering numbers and comprises two counters, one of radix two and the other of radix five. This system is used because it requires less equipment than a counter of radix ten, and has been fully described in the above mentioned Patent 2,512,851.

The keyboard for such a system comprises nine switch positions, the even numbered digits requiring a single contact point and the odd numbered digits requiring two contacts points. For example, the number four key (Fig. 5) makes a circuit, when actuated, to connect one of the conductors 28 from an output stage to a conductor 15*a*, thereby completing a circuit to enable the pulse generator to send two pulses to the tens counter. These two pulses are sent over conductor 15*a* to the radix-of-five part of counter 12 (Fig. 3) to register the value four. If the number five key is actuated, two circuits are made, one through conductor 28, as before, and a second through conductor 30 from the counter impulse generator. The result is a double valued pulse over conductor 15*a*, as before, to the radix-of-five counter and a single valued pulse over conductor 14*a* to the radix-of-two counter. In the counter circuit (Fig. 3) both sets of impulses travel through a double amplifier tube 31. The even pulses are then applied to all the radix-of-five counter trigger stages over conductor 32, and the odd pulse is applied to the radix-of-two counter stage 33 over conductor 34.

The radix-of-two counter (double triode 33) carries to the radix-of-five counter by means of conductor 35 and the right hand triode amplifier in tube envelope 36. The characteristics of the pulse generator are so arranged that the even and odd pulses never arrive at tube 31 at the same interval of time. Hence, a direct carry to the radix-of-five counter, without delay, is possible.

The counter 12, while using the bi-quinary system of registering digits, carries to the next higher order only when the counter progresses from 9 to 0, and in this respect it is similar to any radix-of-ten counting system.

Figure 2:
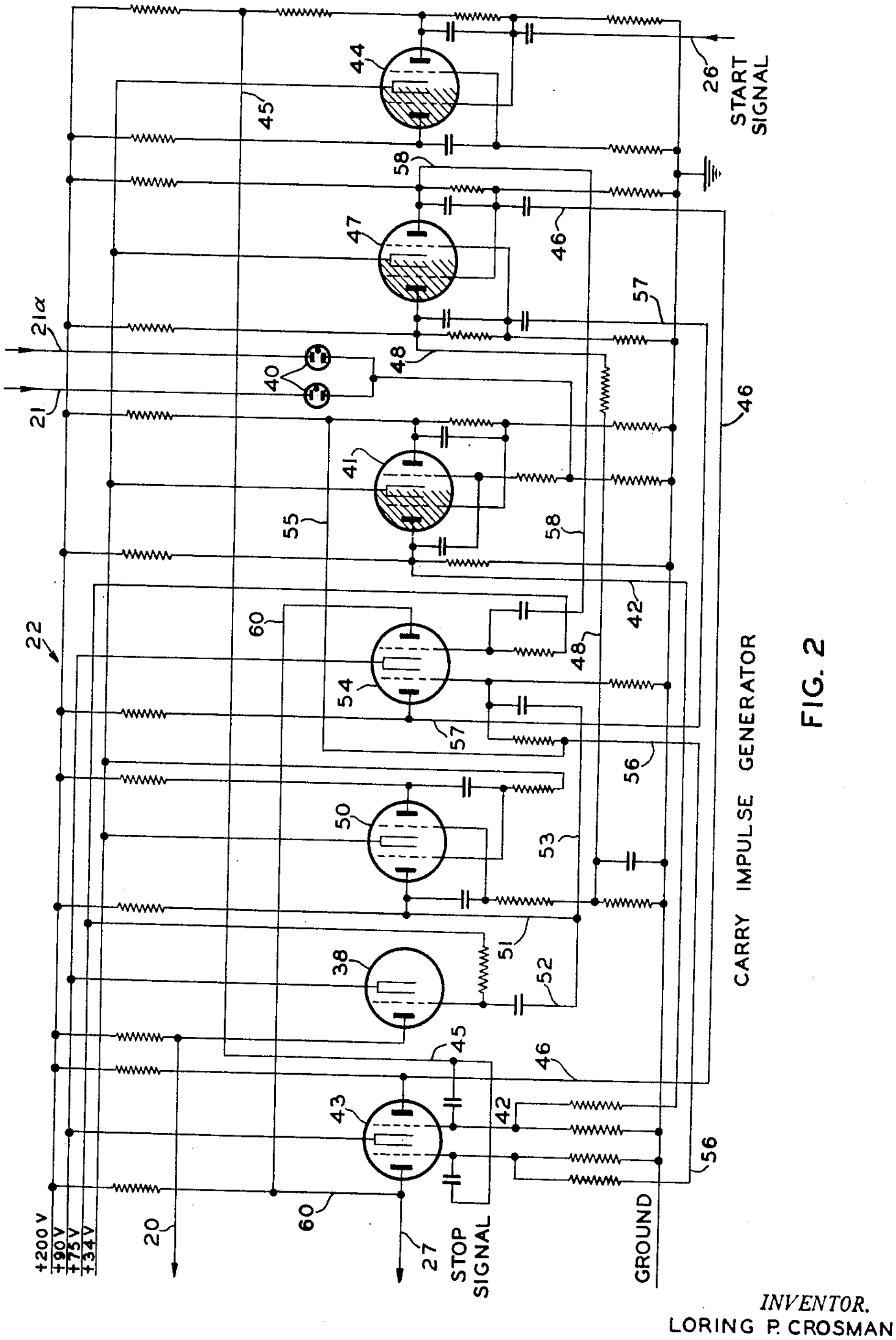
Fig. 2 is a schematic wiring diagram of the carry impulse generator.
Figure 3:
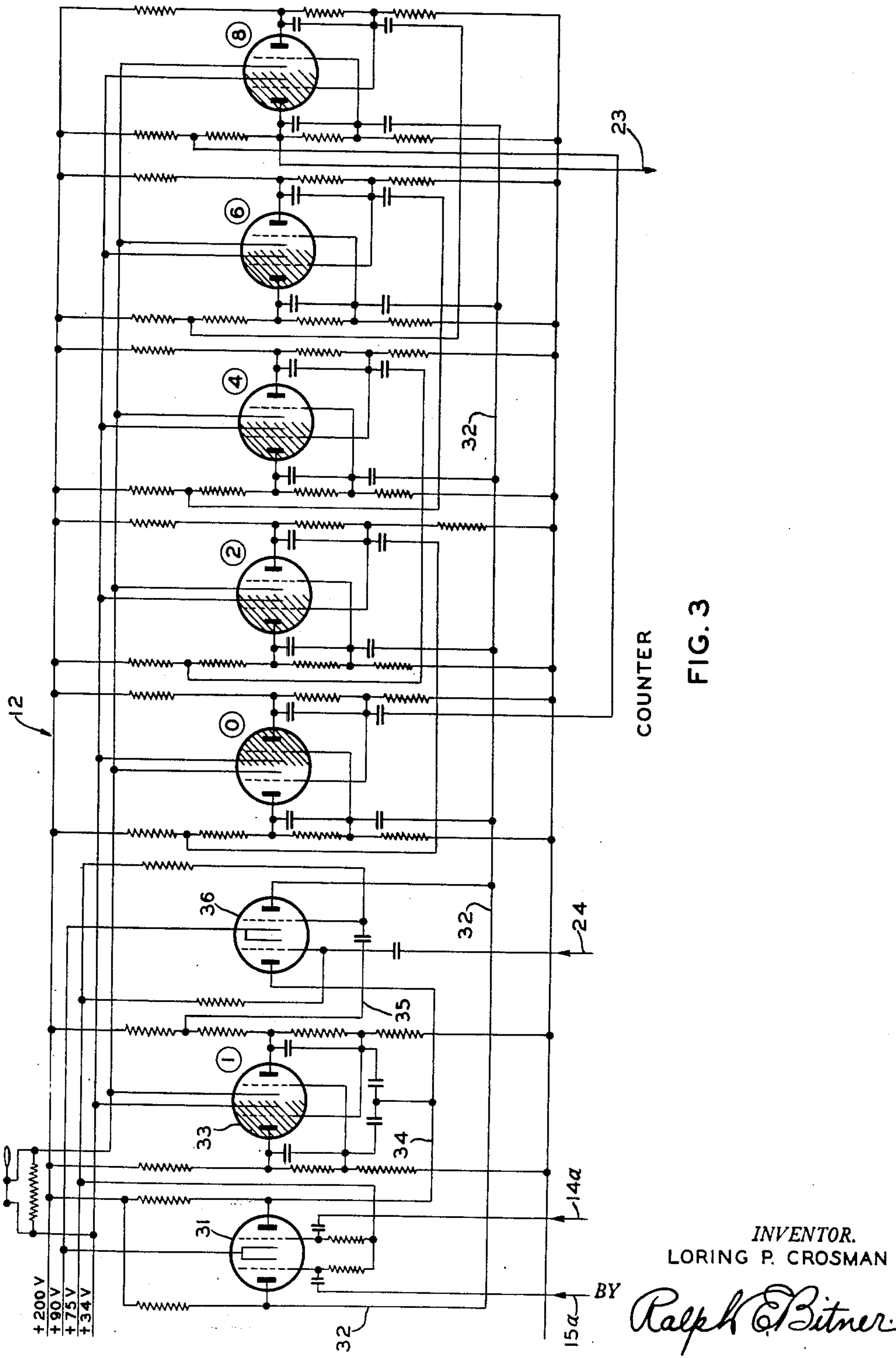
Fig. 3 is a schematic wiring diagram of one of the counters used in the system.
Figure 4:
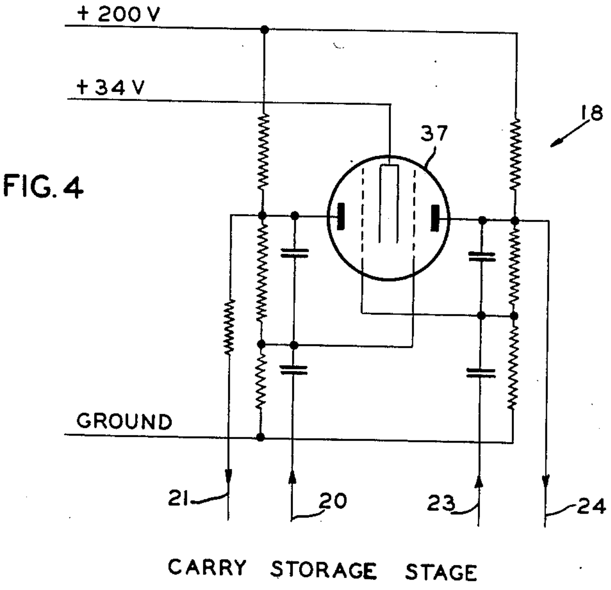
Fig. 4 is a schematic wiring diagram of one of the carry storage stages.
Figure 5:
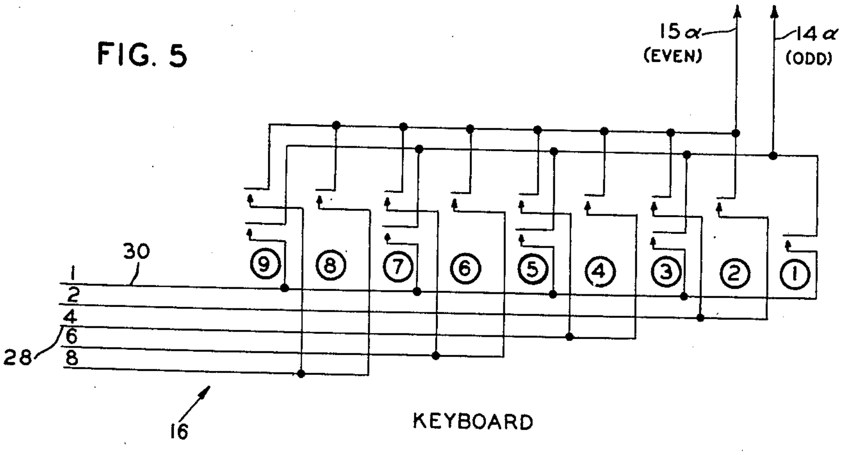
Fig. 5 is a schematic wiring diagram of one order of the keyboard unit.

In order to permit all orders of counters to receive digit values at the same time, the carry operation must be delayed until all the digit values have been received from the keyboard circuit. To this end a carry storage stage (Fig. 4) is connected between all adjacent orders. It comprises a double triode 37 connected as a stable trigger and arranged to be normally conducting on the left hand grid so that a negative pulse over this conductor will actuate the stage and shift conductivity to the right. This stage is actuated to return it to the normal state by conductor 20 which conducts a pulse or a series of pulses from an amplifier tube 38 in the carry impulse generator (Fig. 2).

The carry storage stage 18 sends out a positive and a negative pulse each time its conductance is shifted. These pulses are sent over conductor 21, to the input of the impulse generator, and over conductor 24 to the left hand triode of amplifier 36 in the next higher order counter.

The carry impulse generator (Fig. 2) comprises seven double triodes, and includes a system of generation and control by which the carry storages are actuated at the right time if carry actuations are necessary. When the carry storage stages have all been returned to their normal condition, the carry impulse generator automatically turns itself off and signals this condition to the program control unit.

To accomplish these results, the carry impulse generator includes a carry signal circuit from the carry storage stages. This circuit comprises a set of neon discharge lamps 40, a Schmitt trigger stage 41, conductor 42, and the right hand triode of stage 43 which acts as a gate. Therefore, the only immediate action resulting from a carry indication is the opening of the right hand side of gate 43 and the closing of the left hand side of gates 43 and 54. A second circuit is employed for putting the impulse generator in operating condition. This circuit starts with conductor 26 which transmits the start signal to stage 44, an unbalanced trigger introduced to cause a slight delay. The circuit continues over conductor 45 to stage 43, thence (if the right gate is open) over conductor 46 to a stable trigger stage 47. The potential rise due to actuation of stage 47 passes over conductor 48 to multivibrator 50 which starts oscillating.

A third circuit includes the transmission of the multivibrator pulses. This may be traced from the left hand anode of multivibrator stage 50, over conductors 51 and 52 to stage 38, which is an amplifier and inverter. The output of the amplifier 38 travels over conductor 20 to all the carry storages. Another branch of the multivibrator circuit may be traced over conductors 51 and 53 to the left hand side of a gate amplifier stage 54.

A fourth circuit is employed to stop the multivibrator, return the stages to their normal condition and send out a stop signal to the program unit to signify that other operations may begin. This circuit starts at the right hand anode of the Schmitt trigger tube 41 and may be traced over conductors 55 and 56 to gates 54 (left) and 43 (left). The opening of these two gates permits the multivibrator 50 to send a pulse through stage 54, over conductor 57 to the stable trigger stage 47, actuate it, and send a resulting positive pulse over conductor 58 to the right hand side of gate 54, thence a negative pulse over conductor 60 to conductor 27 and thence to the program unit.

In order to describe the operation of this circuit in detail, let is be assumed that a number, 166, has been entered into the counter system. Then the number 238 is added, resulting, at first, in the number 394 in the counter system plus an actuated storage stage 18 between the units and tens denominational orders. It should be noted that the carry storage stage is actuated as soon as the units counter progresses from nine to zero, which is several pulse intervals before the final unit value of four is entered.

As soon as the carry storage stage (Fig. 4) is actuated, the left hand neon lamp 40 (Fig. 2) is lighted, the Schmitt trigger stage 41 is actuated, transferring its conductance from the left to the right hand side, and a rise in positive potential is applied to the right hand control electrode of stage 43 by way of conductor 42 which raises it from a potential far below cut-off to the cut-off potential where a positive pulse applied to the control electrode can easily cause a considerable anode current to flow. This condition remains until the counting action has finished and the start signal is received over conductor 26.

The start signal is a negative pulse sent from the counter pulse generator and is derived from the same trigger stage that turns off the multivibrator in that assembly. The pulse is applied to the left hand (normally conducting) side of the unstable trigger stage 44 and causes the conductivity to shift to the right hand side, then shift back again. This shift action is only to delay subsequent control action by the carry generator and to make sure that the carry storage stages are actuated after the counting action is finished. The shift of stage 44 to the right sends out a negative pulse which causes no effect. The shift back to normal sends a positive pulse over conductor 45 to both control electrodes of the biased gate stage 43. Only the right hand side has been biased for conduction, the result being a negative pulse sent over conductor 46 to the left hand control electrode of stable trigger stage 47. This pulse actuates the stage, causing it to conduct on the right and thereby increases the potential of the left hand anode. This potential travels over conductor 48 to the right hand side of multivibrator 50, raising the potential of the right hand control electrode and starting the multivibrator oscillations. During this action a negative pulse is sent out by trigger stage 47 over conductor 58 but it causes no effect.

The multivibrator oscillations are taken from the left hand anode of stage 50 and sent, over conductor 53, to the biased amplifier 54 where they have no effect because of the excessive negative bias on the left hand control electrode. The oscillations also are applied, over conductor 52, to amplifier 38 where they are amplified and inverted and then sent as negative pulses, over conductor 20, to all the carry storage stages 18 and 19. These negative pulses are applied to the right hand control electrode of the stages (see Fig. 4), and if the stages have not been actuated, as is the case with stage 19, nothing will happen. Stage 18, however, has been actuated by the addition of a six plus an eight and when the negative pulse is applied over conductor 20 it is actuated again and returned to its normal condition.

When carry storage stage 18 is normalized, it sends a positive pulse over conductor 24 to the tens counter assembly 12 (sees Figs. 1 and 3) and increases its record of digits by one. But counter 12 already had a nine recorded therein because of the addition of a six and a three. The addition of a one, therefore, advances the counter from nine to zero and actuates the carry stage 19. When this occurs, an increase of voltage is sent over conductor **21*a* to the carry pulse generator and the right hand neon lamp 40 is lighted. This action keeps the Schmitt trigger stage 41 in its actuated condition, trigger stage 47** remains in its actuated condition, and the multivibrator continues to oscillate. At this instant the sum of the numbers 166 and 238 is 304 with an actuated storage stage between the tens and hundreds counters.

The second multivibrator oscillation is transmitted through the amplifier-inverter stage 38 as before and applied to all the carry stages. This time stage 18 is not affected because it was returned to normal condition by the first multivibrator pulse. The stage 19, however, has been actuated by the carry from the tens order, and when the second multvibrator pulse arrives, the stage 19 is returned to normal and at the same time a one is added to the hundreds counter, making the recorded three a four. The counter now has a recorded sum of 404, which is the correct value of 166 plus 238.

When carry stage 19 was normalized, the last neon light 40 was put out because of the lowered voltages on conductors 21 and **21*a*. This reduces the potential on the right hand control electrode of Schmitt trigger stage 41 and causes it to return to its normal condition. The potential on conductor 42 is lowered and the right hand side of gate stage 43 is closed. When the Schmitt trigger stage is returned to normal, the right hand anode is raised in potential and this increase is transmitted over conductors 55 and 56 to the left hand control electrode of gate amplifier 43, putting that gate into condition to conduct when a positive pulse is applied to the control electrode. The same increase in potential is transmitted over conductor 55 to the left hand control electrode of biased amplifier 54 which is connected to the multivibrator output by conductors 53 and 51**.

The next multivibrator pulse, therefore, travels over conductors 51 and 53 to stage 54, thence over conductor 57, as a negative pulse, to the right hand control electrode of the stable trigger stage 47, actuating it and returning it to its normal condition. This same multivibrator pulse goes out over conductor 52, is amplified by stage 38, and applied, as before, over conductor 20, to all the carry stages. Since the carry stages have, at this time, been normalized, the pulse has no effect. When stage 47 is normalized, it sends a positive pulse from the right hand anode, over conductor 58, to the right hand control electrode of amplifier 54, thence over conductor 60, as a negative pulse, to conductor 27, which is connected back to the control section of the counter pulse generator (see Fig. 1), and signals that the carry operations are finished.

There may be times when all the carry storage stages are operated at once. This will occur when the number 9999 is added to 1111. In such a case only two pulses from the multivibrator are necessary, one to make the carrys and another to normalize the circuit. If, however, the number 9999 is added to 1, there will be four carry stages actuated, one after the other, in sequence, and five multivibrator pulses will be necessary, four to make the carrys and one to normalize the circuit.

There may also be times when there is no carry stage actuated. Such a condition occurs after the first number has been entered into a counter array that previously registered zero. In this case no neon lamps will be lighted, the Schmitt trigger stage 41 will be in its normal state, conducting on the left side, and a raised potential exists on conductors 55 and 56 to raise the potential of the left hand control electrode of gate stage 43. In this condition the start control pulse, received from the pulse generator over conductor 26, will first actuate the unstable trigger stage and then, after a short delay, send a positive pulse over conductor 45 to the left hand section of stage 43 and thence out over conductor 27 to give the signal that carry operations are not required.

From the above descriptions it will be evident that the system described above makes carry operations from any denominational order counter to the counter of next higher order. When simultaneous carry operations are possible they are made by the same control pulse; when no carrys are to be made, the system sends a signal to report that condition without waste of time.

What is claimed is:

1. An electronic carry system for adding a unit digit value to one order counter after the next lower order counter has progressed from nine to zero comprising: a series of counters, one for each denominational order, for receiving, adding, and storing digit values; a trigger carry stage connected between each counter and the counter of the next higher order, said carry stages having a normal condition and an actuated condition; a coupling circuit for applying an actuating electric pulse from one order counter to the carry stage connected to the next higher order counter when the lower counter progresses from nine to zero; a pulse generator, controlled by the condition of the carry stages, for simultaneously applying an electric pulse to all carry stages when one or more carry stages is in an actuated condition; and a coupling circuit connected between each carry stage and the next higher order counter for applying a counting pulse to that counter when the carry stage is changed from an actuated to a normal condition.

2. An electronic carry system for adding a unit digit value to one order counter after the next lower order counter has progressed from nine to zero comprising: a series of counters, one for each denominational order, for receiving, adding, and storing digit values; a trigger carry stage connected between each counter and the counter of next higher order, said carry stages having a normal condition and an actuated condition; a coupling circuit for applying an actuating electric pulse from one order counter to the carry stage connected to the next higher order counter to change the carry stage from a normal condition to an actuated condition when the lower order counter progresses from nine to zero; a coupling circuit for applying an electric counting pulse from each carry stage to the higher order counter to add a unit digit value to that order when the carry stage is changed from an actuated condition to a normal condition; and a pulse generator, controlled by the condition of the carry stages, for simultaneously applying an actuating electric pulse to all carry stages to normalize those carry stages which were actuated during a counting operation.

3. An electronic carry system for adding a unit digit value to one order counter after the next lower order counter has progressed from nine to zero comprising: a series of counters, one for each denominational order, for receiving, adding, and storing digit values; a trigger carry stage connected between each counter and the counter of next higher order, said carry stages having a normal condition and an actuated condition; a coupling circuit for applying an actuating electric pulse from one order counter to the carry stage connected to the next higher order counter to change the carry stage from a normal condition to an actuated condition when the lower order counter progresses from nine to zero; a coupling circuit for applying an electric counting pulse from each carry stage to the higher order counter to add a unit digit value to that order when the carry stage is changed from an actuated condition to a normal condition; a pulse generator for simultaneously applying an actuating pulse to all carry stages to normalize those carry stages which were actuated during a counting operation; and a control circuit between each carry stage and the pulse generator for controlling the generator to send actuating pulses to all carry stages as long as any of said carry stages are in the actuated condition.

4. In combination, a first information receiving register, a second information receiving register, a third information receiving register, information input means connected with said registers, a first intermediate register set in response to overflow in said first information receiving register and introducing an entry into said second information receiving register independently of said input means when cleared, a second intermediate register set in response to overflow in said second information receiving register and introducing an entry into said third information receiving register independently of said input means when cleared, a clearing signal line conductor connected in parallel to a clearing input of each of said intermediate registers, apparatus for repetitively applying clearing pulses to said clearing signal line, and means for determining the repetitive actuation of said clearing signal line conductor under the control of said intermediate storage registers.

5. In combination, a first information receiving register, a second information receiving register, a third information receiving register, information input means connected with said registers through a control circuit capable of exerting an inhibiting action on said connection, a first intermediate register responsive to overflow occurring in said first information receiving register controlling information entries into said second information receiving register independently of said information input means, a second intermediate register responsive to overflow occurring in said second information receiving register controlling information entries into said third information receiving register independently of said information input means, a clearing signal line conductor connected in parallel to a clearing input of each of said intermediate registers, apparatus for repetitively applying clearing pulses to said clearing signal line conductor, and apparatus determining the inhibiting action of said control circuit in whenever all of said intermediate registers have been cleared after the initiation of the intermediate register clearing operation.

References Cited in the file of this patent

UNITED STATES PATENTS

| | | |
|---|---|---|
| 2,176,932 | Smith | Oct. 24, 1939 |
| 2,484,115 | Palmer et al. | Oct. 11, 1949 |
| 2,502,360 | Williams | Mar. 28, 1950 |
| 2,514,035 | Dickinson | July 4, 1950 |

OTHER REFERENCES

"Electronic Computing Circuits of the Eniac," A. W. Burks, Proc. I. R. E., vol. 35, No. 8, August 1947, pp. 756–767.